United States Patent [19]
Calmettes et al.

[11] Patent Number: 5,530,996
[45] Date of Patent: Jul. 2, 1996

[54] BAND CLAMP FITTING STRUCTURE

[75] Inventors: Lionel Calmettes, Romorantin Lanthenay; Pascal Detable, Gievres; Michel Andre, Romorantin Lanthenay, all of France

[73] Assignee: Etablissements Caillau, Issy Les Moulineaux, France

[21] Appl. No.: 241,606

[22] Filed: May 11, 1994

[30] Foreign Application Priority Data

May 19, 1993 [FR] France ................... 93 06046

[51] Int. Cl.$^6$ ................... F16L 33/02
[52] U.S. Cl. ................... 4/20 R; 24/20 TT
[58] Field of Search ................... 27/20 R, 20 W, 27/20 TT, 20 EE, 20 S, 23 R

[56] References Cited

U.S. PATENT DOCUMENTS

| | | | |
|---|---|---|---|
| 3,295,176 | 1/1967 | Bright | 24/20 |
| 4,890,360 | 1/1990 | Calmettes et al. | 24/20 R |

FOREIGN PATENT DOCUMENTS

| | | |
|---|---|---|
| 003192 | 7/1979 | European Pat. Off. . |
| 243224 | 10/1987 | European Pat. Off. . |
| 460989 | 12/1991 | European Pat. Off. . |
| 491609 | 6/1992 | European Pat. Off. . |
| 491610 | 6/1992 | European Pat. Off. . |

Primary Examiner—James R. Brittain
Attorney, Agent, or Firm—Marshall & Melhorn

[57] ABSTRACT

A clamp fitting is formed by an internal segment of metal band wound upon itself, and an external segment of metal band formed about a portion of the internal segment. The internal segment extends for more than one complete circumference such that the outer end of the internal segment overlaps the internal end of the internal segment to form a continuous internal surface. The outer end of the internal segment presents an ear by two folds of band placed back to back and projecting radially on the outer periphery of the clamp. The external band segment extends only for a partial circumference. One end of the external segment is attached to the outer face of the internal segment. The other end of the external segment is shaped as a hook capable of hooking behind the ear to maintain the clamp in a tightened position.

1 Claim, 1 Drawing Sheet 5,530,996

BAND CLAMP FITTING STRUCTURE

FIELD OF THE INVENTION

The present invention relates to a band clamp fitting structure.

BACKGROUND OF THE INVENTION

Patent EP-A-3192 discloses a clamp fitting constituted by a metal band, wound on itself, of which one of the ends presents an ear projecting radially on the outer periphery of the clamp and of which the other end is shaped as a hook capable of hooking behind the ear to maintain the clamp tightened.

It is known that one of the principal advantages of this prior-art clamp is that of avoiding, in principle, any permanent deformation of the various zones of the band which constitutes it, when it is positioned and tightened.

This type of clamp has already been improved in various ways, in particular to give it a reserve of elasticity enabling a sufficient tightening to be maintained in the case of modification of the dimensions of the object to be clamped, in particular under the effect of the variations in temperature. In this respect, reference may be made to Patents EP-A-469 989, 491 609 or 491 610. Other improvements have aimed at improving the abutment of the clamp on the object to be clamped, particularly a flexible hose pipe fitted on a rigid coupling. In this respect, reference may be made to Patent EP-A-243 224.

However, it has been realized, in certain difficult cases, that the quality of the clamps described in the above-mentioned Patents does not appear sufficient. More precisely, it is sometimes required that the abutment of the clamp on the object to be clamped present no discontinuity and in particular that the discontinuity existing opposite the ear be completely eliminated. The latter is in fact constituted by two folds of the band placed back to back and the rounded connection of the folds to the band itself causes a small discontinuity of the inner periphery of the clamp to appear, particularly if the opposite faces of the folds are not strictly in contact with each other. The continuity of the abutment which was already obtained under the hook by the presence of the extension of the band beyond the ear, described in particular in Patent EP-A-3192, must, of course, be conserved.

The invention therefore has for an object to provide a solution to the problem which has just been set forth and, to that end, it proposes a novel band clamp fitting structure of the type described hereinabove.

SUMMARY OF THE INVENTION

According to the invention, the metal band constituting the clamp comprises two portions, of which a so-called internal portion extends over more than one complete circumference, with partial overlapping of its outer end and its inner end, and of which the other, so-called external portion extends only over a part of circumference. The external portion is fixed, at one of its extremities, by any appropriate means, for example by riveting or welding, on the outer face of the internal portion and is suitably formed at its other extremity to constitute the hook, the ear itself being disposed at the extremity of the outer end of the internal portion.

Thanks to these arrangements, not only the discontinuity of abutment which existed beneath the ear may be eliminated, but also the discontinuities of the inner periphery of the clamp which may result from certain accessory elements, such as the reserves of elasticity.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
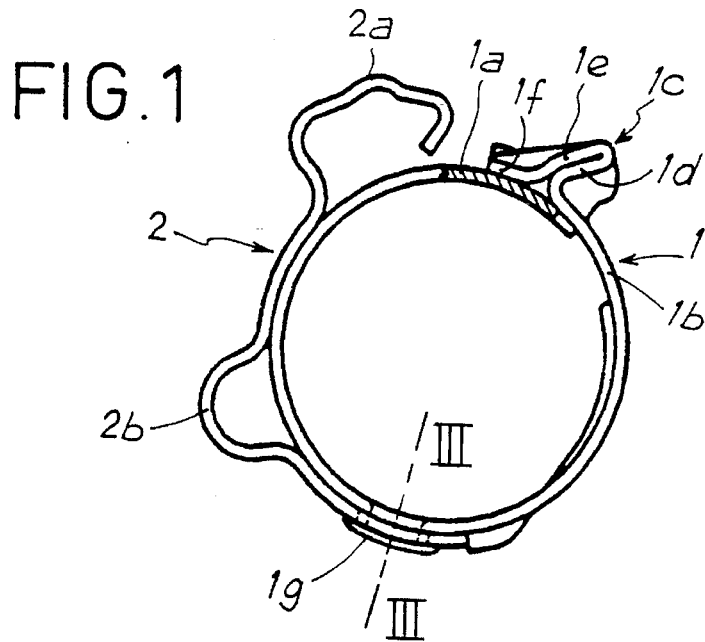
FIG. 1 is a view in elevation, with partial section, of a band clamp fitting according to the invention, before it is tightened.
Figure 2:
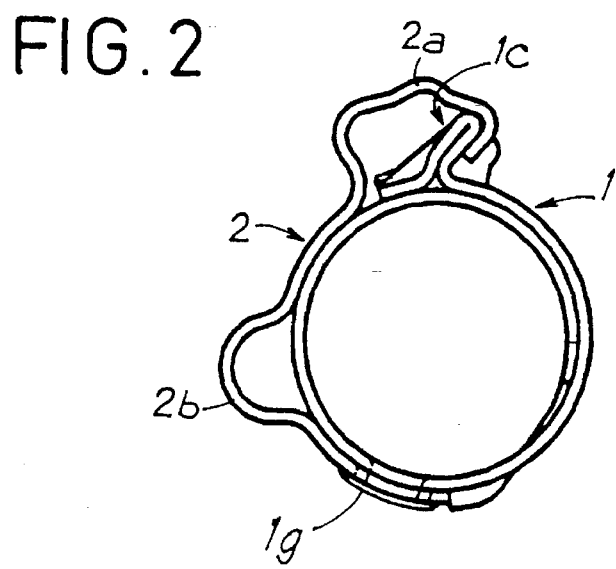
FIG. 2 is a view similar to FIG. 1, after it has been tightened.
Figure 3:
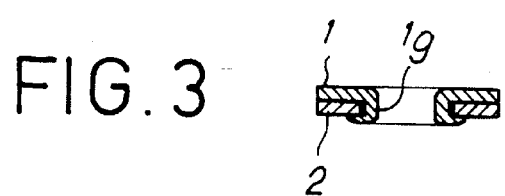
FIG. 3 is a section along III—III of FIG. 1.

Referring now to the drawings, the Figures show a clamp fitting constituted by two portions 1 and 2 of metal band, preferably, but not necessarily, made in the same band. The two portions will thus present the same width and the materials constituting them will have the same physical properties, particularly the same elasticity, but one and/or the other of these characteristics need not be used.

Portion of band 1 is referred to as internal portion and extends over more than one complete circumference, the extremities of its two inner (1a) and outer (1b) ends partially overlapping. Appropriate means, such as those described in Patent EP-A-243 224, ensure a perfect continuity of the inner periphery of the portion of band 1 in the zone of overlap of its two ends.

At the extremity of its outer end 1b, the portion of band 1 bears an ear 1c constituted by two folds 1d and 1e placed back to back. The outer fold 1e is preferably provided with a small extension 1f whose length may be determined in accordance with the arrangements provided in Applicants' Patent Application filed this day and entitled: "Band clamp fitting".

In addition, known arrangements may be provided, both for rigidifying the ear 1c and for facilitating hold of the tightening tool on the ear side; although shown in the drawings, these arrangements are not necessary within the framework of the invention and will therefore not be described.

Portion of band 2 is judiciously shaped at one of its extremities to constitute a hook 2a. At its other extremity, portion 2 is fixed on the outer face of portion 1 by any appropriate means.

In the example shown, fixation is effected by riveting, i.e. by caulking, on portion 2 the edges of a cylindrical stamping 1g made in portion 1. Complementary arrangements, visible in the drawings, may be provided to eliminate any aggressiveness of the extremity of the portion of band 2 beyond its fixation on portion 1.

Portion of band 2 comprises at least one undulation 2b constituting a reserve of elasticity making it possible, as is known, to maintain a sufficient tightening effort in the case of variation in the diameter of the object to be clamped.

The structure of the clamp having been described, it must be emphasized that the portions of band 1 and 2 are formed so as to present similar curvatures allowing the clamp to be tightened under the conditions described in the above-cited Patents, particularly in Patent EP-A-3192.

However, it is seen that, even before the clamp is tightened, but especially afterwards, the space located beneath the hook 2a as well as the zone of join of the folds 1d and 1*e* to the outer end 1*b* are located opposite the inner end 1*a* of the first portion of band 1. The same applies to the space located beneath the undulation 2*b*. After tightening, perfect continuity of the inner periphery of the clamp and, consequently, of the abutment on the object to be clamped, is established by the cooperation of the means provided to that end, on the outer end 1*b* and at the extremity of the inner end 1*a*.

What is claimed is:

1. A clamp fitting comprising:

an internal segment of metal band wound on itself defining an inner end and an outer end, the outer end overlapping the inner end of said internal segment to form a continuous inner surface and an outer surface;

an external segment of metal band formed about a portion of the outer surface of said internal segment, said external segment having a fixed end secured to the outer surface of said internal segment and a free end positioned adjacent the outer end of said internal segment;

a complementary fastening means on the outer end of said internal segment and on the free end of said external segment, said fastening means including an ear integrally formed in the outer end of said internal segment and projecting radially outward therefrom, and a hook integrally formed at the free end on said external segment, the hook and the ear of said fastening means adapted to be coupled to each other and to maintain the continuous inner surface after the clamp is tightened; and an undulation formed in said external segment of metal band, said undulation spaced apart from the hook at the free end of said external segment for providing a reserve of elasticity.

* * * * *